United States Patent [19]

Carroll et al.

[11] 4,032,032
[45] June 28, 1977

[54] FLAME GUARD ANTI-ROTATION DEVICE

[76] Inventors: William Michael Carroll, 1111 E. Dean Road, Milwaukee, Wis. 53217; John Day, Studio House, Shatterford, Warley, Worcestershire, England

[22] Filed: May 4, 1976

[21] Appl. No.: 682,839

[52] U.S. Cl. ............................ 220/94 R; 16/110 A; 16/116 R

[51] Int. Cl.² ........................................ B65D 25/28

[58] Field of Search ......... 16/116 R, 110 A, 114 A; 220/94 R

[56] References Cited

UNITED STATES PATENTS

| | | | |
|---|---|---|---|
| 1,333,760 | 3/1920 | Lamb | 16/116 R |
| 1,577,470 | 3/1926 | Koehler | 16/116 R |
| 1,606,833 | 11/1926 | Grover | 16/114 A |
| 2,345,248 | 3/1944 | Farber | 16/116 R |
| 2,372,954 | 4/1945 | Jester | 16/116 R |
| 2,504,344 | 4/1950 | Morrison, Jr. et al. | 16/116 R |
| 3,143,759 | 8/1964 | Kennedy | 16/114 A |
| 3,616,964 | 11/1971 | Yamazaki | 16/116 R X |

FOREIGN PATENTS OR APPLICATIONS

| | | | |
|---|---|---|---|
| 1,077,475 | 7/1967 | United Kingdom | 16/114 A |

*Primary Examiner*—Andrew V. Kundrat
*Attorney, Agent, or Firm*—Haight, Hofeldt, Davis, Jambor

[57] ABSTRACT

A flame guard assembly for mounting a handle upon a cooking vessel in a manner to facilitate assembly and to preclude relative rotation of the handle and the vessel. The assembly includes a tubular member with shaped ends for interfacing with the handle and the vessel and a safety interlock plate inserted over the handle attaching stud of the vessel and within the tubular member.

11 Claims, 9 Drawing Figures

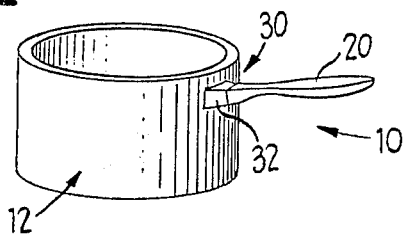
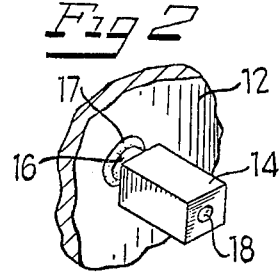
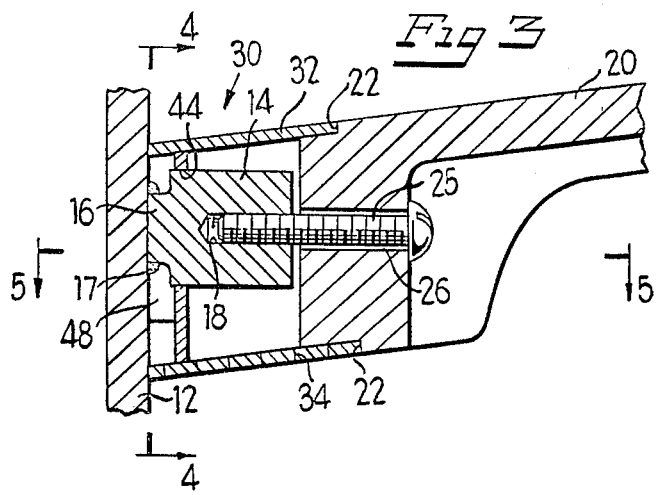
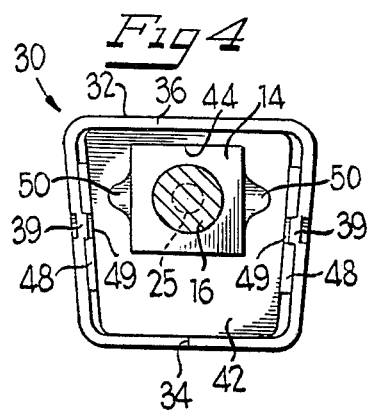
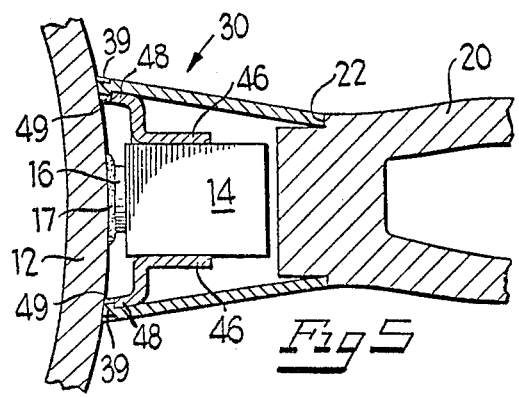
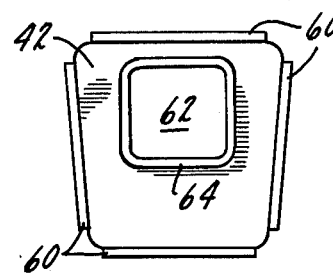
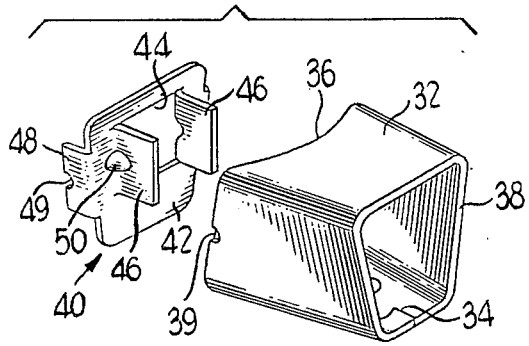
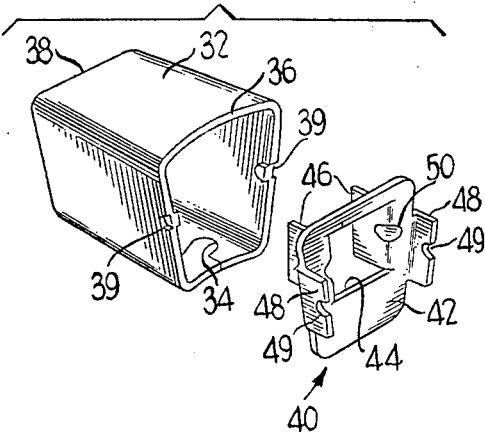

FLAME GUARD ANTI-ROTATION DEVICE

BACKGROUND OF THE INVENTION

This invention relates to a cooking vessel. More particularly, the invention is directed to an improved spacer for mounting a handle upon a cooking vessel. Such spacer assemblies are conventionally called flame guards and serve the functions of mounting the handle upon the vessel; limiting heat transfer to the handle; and minimizing rotation of the handle relative to the vessel.

In assembly, the handle is usually secured to the flame guard and to the vessel by a bolt passing through the handle, the flame guard, and engaging a weld stud affixed to the vessel. Such conventional assemblies require some dexterity in assembly, and depend upon the curvatures of the vessel and the tightness of the bolt to prevent relative rotation of the handle and the vessel. If the radius of the vessel is large or if the bolt works loose a condition may exist where a vessel of hot foodstuffs may rotate relative to the handle and spill.

SUMMARY OF THE INVENTION

To reduce assembly costs and to minimize such conditions, the instant invention is directed to a flame guard assembly and a safety interlock plate. The assembly comprises a flame guard which is preferably tubular in cross section and has ends which interface with the vessel and the handle. Preferably, the assembly includes an interlock plate positioned within the flame guard in mating locked relation. This plate is provided with an out of round aperture for receiving an out of round projection (usually a weld stud) affixed to the cooking vessel, and for precluding relative rotation of the vessel and the interlock plate. Preferably, the interlock plate is provided with flanges for gripping the weld stud and for maintaining the plate and flame guard in fixed position during assembly such that the bolt is automatically aligned with the threaded aperture of the weld stud.

Accordingly, it is an object of the instant invention to provide a flame guard assembly which minimizes the possibility of relative rotation of a cooking vessel and its handle, and which facilitates the assembly of the cooking utensil. It is a further object of this invention to provide an interlock insert or plate which precludes rotation of the handle and which initially aligns and secures the flame guard, the handle and the bolt with the weld stud of the cooking vessel to facilitate assembly. Additionally, the instant invention may comprise an insert which, in addition to limiting rotation, reinforces and strengthens the tubular flame guard.

DESCRIPTION OF THE DRAWINGS

The manner in which these and other objects of the invention are achieved will be explained in the following specification and drawings, in which:

FIG. 1 is a perspective view of a cooking utensil;

FIG. 2 is an enlarged perspective view of a cooking vessel with its associated weld stud;

FIG. 3 is a side elevation view of a preferred embodiment of my invention taken through a vertical center line;

FIG. 4 is a side elevational view of the preferred embodiment taken along the lines 4—4 of FIG. 3;

FIG. 5 is a plan view taken along the lines 5—5 of FIG. 3;

FIG. 6 is an exploded perspective view of the preferred embodiment of FIG. 3 taken from the rear;

FIG. 7 is an exploded perspective view of the preferred embodiment of FIG. 3 as viewed from the front;

FIG. 8 is a side elevation view of an alternative embodiment of the interlock plate of our invention; and FIG. 9 is a perspective view of another alternative embodiment of our invention.

DETAILED DESCRIPTION

As shown in FIG. 1, a conventional cooking utensil 10 includes a vessel 12, having a handle 20 supported upon a tubular spacer or flame guard 30. These three items are usually held together by a bolt passing through the handle, the flame guard and into a threaded member of the vessel. This interconnection is shown in FIGS. 2 and 3 in which a stud having a threaded aperture 18 is affixed to the vessel 12 by a weld 17. The weld stud shown in FIG. 2 is generally square and has an annular shank 16 which receives the weld. Conventionally, a flame guard 32 is loosely positioned over the weld stud 14 while a bolt 25 passes through an aperture 26 within the handle, the flame guard and into the threaded aperture 18. Thus, the threaded engagement places compressive forces on the flame guard and results in tight frictional engagement between the handle, flame guard and vessel.

As shown in FIGS. 6 and 7, the flame guard has contoured ends 36 and 38 which mate with the radius of the vessel 12 and the end of handle 20.

Normally, the flame guard is telescoped over a reduced diameter of the handle and abuts the shoulder 22 which joins the normal diameter of the handle. Excellent contour matching between the ends of flame guard, the handle and the vessel can be achieved by forming the flame guard from sheet material. Such includes stamping the contours from flat sheet; forming the tube about a mandrel and interlocking the ends by the use of a lock seam 34 such as that shown in U.S. Pat. No. 233,000.

The above discussion relates to many cooking utensils currently manufactured. While currently acceptable, the instant invention is directed to functional improvements. Assembly can be simplified providing locating and holding means to initially center the handle and align the bolt 25 with aperture 18. Further, relative rotation between the vessel and handle is prevented by a mechanical interlock, eliminating reliance upon frictional forces and the contours of the vessel.

This mechanical interlock assembly 30 comprises an interlock plate 40 and its cooperative assembly with the flame guard 32. A preferred embodiment of the plate is best depicted in FIGS. 6 and 7. This plate is formed of flat sheet material having a flat portion 42 of a cross section which generally conforms to the internal shape of the flame guard 32. Within the plate is a square aperture 44 preferably formed by flanging two flanges 46 rearwardly. Although not visually illustrated, these flanges 46 are slightly tapered towards one another, and are reinforced in this position by a reinforcing rib 50 stamped into the junction of the flange 46 with the plate 42. This taper results in a gripping, frictional engagement of the flanges with the weld stud 14. With reference to FIGS. 4 and 5, it can be seen that the square or non-annular weld stud 14 and aperture 44 preclude relative rotation between the plate 42 and the vessel.

With plate 42 locked against rotation relative to stud 14 and vessel 12, the non-annular edges of plate 42 engage with the internal circumference of flame guard 30 to interlock these members. Accordingly, the inter-engagement of non-annular surfaces the handle is locked against rotation relative to the vessel 12. Now, the interconnection is not dependent upon friction and curvature of the vessel.

Preferably, the plate 42 is formed with two forwardly extending flanges 48 which will abut against the circumference of the vessel. These are formed on the periphery of plate 40 to avoid any possibility of interference with weld bead 17 and are slightly tapered outwardly relative to the walls of the flame guard 32. Formed in the forward edge of these flanges are notches 49 which mate with projections 39 stamped in the forward edge of the flame guard. With this cooperative arrangement, the interlock plate 42 can be inserted and locked within the flame guard 32 for preassembly, the outward taper biasing the notches 49 into engagement with projections 39.

During assembly, the flame guard assembly 30 is merely placed over the weld stud 14. The aperture 44 of plate 42 first centers the assembly and the tapered flanges grip and hold the assembly to the weld stud while the handle 20 and bolt 25 are affixed. Such positioning by the plate 42 minimizes the problem of the locating bolt 25 relative to aperture 18. It is guided into position by aperture 26 of the handle which is itself positioned by the flame guard.

Two other embodiments of our invention are depicted in FIGS. 8 and 9. The device of FIG. 8 includes a plate 42 having four flanges 60 extending outwardly for engagement with vessel 12. Additionally, the aperture 62 is an extruded aperture defining a continuous flange extending in the same direction. With reference to FIG. 9, the plate 42 has only two flanges 64 extending forwardly while the center aperture 66 is merely stamped to fit over weld stud 14.

Only the preferred embodiments of our invention have been shown. While the interlock plate 40 disclosed is preferably formed of flat metal sheet, high temperature resistant plastics may be used in an injection molding process. A plastic interlock would also have an out of round aperture and a circumference which would mate with the internal diameter of the flame guard.

We claim:

1. In a cooking utensil having a vessel with weld stud mounted thereon and a handle extending from said weld stud, an improved safety interlock between said handle and said vessel, said interlock comprising:
   a. a non-circular tubular member having ends interfacing with the vessel and the adjacent end of the handle, and extending over said weld stud;
   b. separate interlock means within said tubular member spaced from the adjacent end of said handle and having an aperture extending over and frictionally engaging said weld stud and a periphery engaging said tubular member, said weld stud, interlock means and said tubular member being non-annular for precluding relative rotation between said vessel and said handle; and
   c. bolt means extending through said handle, tubular member and threaded into said weld stud for joining said assembly.

2. An apparatus as recited in claim 1 in which said aperture is formed by flanges turned outwardly from the plane of said plate and said flanges are biased towards frictional engagement with said weld stud.

3. An apparatus as recited in claim 1 in which said interlock means is attached to said tubular member.

4. In a tubular flame guard for spacing a handle from an associated cooking vessel, a safety interlock for precluding rotation of said handle relative to said vessel, said interlock comprising:
   a. a separate insert having an external non-annular external surface mating with an internal surface of said flame guard and spaced from the adjacent end of said handle;
   b. a non-annular aperture within said insert for complementing the periphery of a non-annular weld stud secured to said vessel; and
   c. means attached to said insert for initially positioning said flame guard relative to said vessel.

5. An apparatus as recited in claim 4 in which said insert is formed of metal.

6. An apparatus as recited in claim 5 in which said means for initially positioning said flame guard comprises opposing flanges tapered inwardly towards said aperture to frictionally engage said weld stud.

7. An apparatus as recited in claim 4 in which said insert is provided with outwardly extending flanges for frictionally engaging said flame guard.

8. A flame guard assembly comprising:
   a. a non-annular tubular member having contoured ends for interfacing with a cooking vessel and adjacent end of the handle; and
   b. a separate insert affixed within said tubular member and spaced from the end of said handle, said insert having a non-annular aperture for complementing frictionally engaging the periphery of a non-annular weld stud of a cooking vessel; and
   c. said insert having a non-annular periphery frictionally engaging the internal surface of said non-annular tubular member, said insert facilitating assembly of said flame guard upon a weld stud of a cooking vessel.

9. An apparatus as recited in claim 8 in which said insert is formed of aluminum.

10. An apparatus as recited in claim 8 in which said insert and said tubular member have cooperative locking means for affixing said insert within said tubular member.

11. An improved cooking utensil interlock between a vessel and a handle comprising:
   a. a tubular member having a non-annular internal surface having ends contoured for mating with a vessel and the adjacent end of the handle;
   b. a threaded member rigidly affixed to said vessel and having a non-annular surface; and
   c. a seperate locking plate spaced from the adjacent end of said handle and for mating with said surface of said threaded member, and a second non-annular periphery for engaging the internal surface of said tubular member, said engaging surfaces precluding rotation between said vessel and said tubular member.

* * * * *